United States Patent [19]
Host

[11] Patent Number: 5,847,513
[45] Date of Patent: Dec. 8, 1998

[54] AUTOMOTIVE HIGH MOUNT BRAKE LIGHT IMPROVEMENT

[76] Inventor: Rudolph P. Host, 815 NW. 83rd St., Seattle, Wash. 98117

[21] Appl. No.: 543,833

[22] Filed: Oct. 16, 1995

[51] Int. Cl.[6] ...................................................... B60Q 1/44
[52] U.S. Cl. .............................. 315/80; 315/82; 340/475; 340/479; 307/10.8
[58] Field of Search ..................................... 340/469, 467, 340/479, 475; 315/80, 81, 82, 83, 76, 77; 307/9.1, 10.1, 10.8

[56] References Cited

U.S. PATENT DOCUMENTS

| | | | |
|---|---|---|---|
| 4,922,225 | 5/1990 | Danhert | 340/467 |
| 4,987,405 | 1/1991 | Jakobowski | 340/479 |

*Primary Examiner*—Don Wong
*Assistant Examiner*—David Vu
*Attorney, Agent, or Firm*—T. W. Secrest

[57] ABSTRACT

The improved system employs a logic unit coupled to the conventional brake switch, the turn signal and a clutch, or, optionally, an emission system low speed switch, and/or one or more safety-affecting parameters, viz., light level or other ambient conditions including fog or precipitation as sensed by applicable switch positions, to control the mode of illumination of the auxiliary light. The auxiliary light has the capability of operating in two illumination modes: steady-state as an extension of the main brake lights or flashing. Flashing of the auxiliary brake light can occur concurrently with or independent of the illumination state of the conventional main brake lights. Concurrent activation of both the brake and clutch or, optionally, the emission system low speed switch sets the flashing mode for the auxiliary high mount light. When one or more safety-affecting parameters are present, depressing only the brake pedal is necessary to set the flashing mode. This flashing mode is retained until both the brake switch and the clutch switch or, optionally, the emission system low speed switch are deactivated. Included is a method for precluding the flashing of the auxiliary light when the turn signal system is activated.

45 Claims, 7 Drawing Sheets

AUTOMOTIVE HIGH MOUNT BRAKE LIGHT IMPROVEMENT

STATEMENT AS TO RIGHTS TO INVENTIONS MADE UNDER FEDERALLY SPONSORED RESEARCH AND DEVELOPMENT

The invention was made and developed with private money. There was no federally sponsored research for the development of this invention.

CROSS-REFERENCES TO RELATED PATENT APPLICATIONS (if any)

There is no related application.

BACKGROUND OF THE INVENTION

1. Field of the Invention

This present invention relates to systems for operating rear collision-avoidance warning lamps. More specifically, the invention is directed to an improved use of the auxiliary high mount brake light used on motor vehicles.

2. Description of the Prior Art

In an effort to reduce the frequency of rear-end collisions, it has been suggested that an extra central rear-mounted red "third" brake warning light or auxiliary light be employed on automobiles. This recommendation was especially important for the common passenger car. The U.S. Department of Transportation mandated installation of a central brake light unit in or at the level of the rear window to be original equipment on all new automobiles sold in the United States after Sep. 1, 1985 and all new multi-purpose vehicles (vans) sold after Sep. 1, 1993. An example of such a light is disclosed in U.S. Pat. No. 4,575,782, issued on Mar. 11, 1986, to Levine et al.

Close analysis reveals that the message given by the central brake light is identical to that of the standard brake lights. The message is limited to what is suggested by the depression of the brake pedal. The advantage of its use is in the mounting method of the brake light. Typically, the brake light is centrally mounted in the rear of the vehicle in such a way as to be closer to a horizontal line of sight for the operator of the trailing vehicle.

The current Department of Transportation mandated brake light, although a step forward in highway safety, does not provide for many dangerous conditions. This brake light may well lead to unfortunate over-reliance on it by the driver of the trailing vehicle. For example, if a forward vehicle equipped with such an extra brake light stops on a highway, the driver of a trailing vehicle approaching from the rear will see the auxiliary light, only so long as the driver keeps a foot on the brake pedal. When the brake-activated light is out, it is assumed that the forward vehicle is always joining the flow of automobiles. Additional observation on the part of the driver of the trailing vehicle is then required to decide whether the forward vehicle is slowing, or is stopped, or is joining the flow of traffic. In traffic jams, as soon as the forward vehicle's brake light goes out, trailing drivers accelerate forward. Then they immediately apply their brakes in panic when they discover that the forward vehicle has not joined the flow of traffic or the flow of automobiles. Additionally, an inoperative auxiliary brake light may lead to serious detrimental consequences as a result of a rear end collision with the forward vehicle.

SUMMARY OF THE INVENTION

It has been proposed in the patent and other technical literature that uniform brake light intensity is inferior to conditionally varying the brake light intensity or switching rate (e.g., flashing) when brakes are applied. U.S. Pat. No. 5,231,373 to Freeman et al (1993) controls the intensity of the auxiliary light but does not change its mode from steady state to flashing state even under adverse conditions. Adverse conditions are determined by the addition of sensors and supporting circuitry. This increases the system cost.

Several attempts have been made to flash the auxiliary light. One example is U.S. Pat. No. 4,922,225 to Dankert (1990). This patent limits the flashing of the auxiliary light to being concurrent with the flashing of the turn signal lights. This is unfavorable since the following vehicle operators have to contend with more than one flashing light, viz., the turn signal light and the auxiliary light. This occurs every time the turn signal switch is activated without the application of the brakes.

U.S. Pat. No. 4,841,276, Abel et al (1989), flashes the auxiliary light to create perceived intensity level variations. This is realized by changing the duty cycle as a function of one or more safety-affected parameters. The parameters are such as deceleration, light level or other ambient conditions including fog or precipitation. The safety-affected parameters, however, are evaluated by sensors which add expense to the system.

U.S. Pat. No. 4,970,493, Yim (1990), flashes red lights contained in an auxiliary light assembly, also containing green and yellow lights, when the brake switch is closed. The design, however, cannot use the built-in turn signal flasher to accomplish this but instead uses a separate blinker circuit. In addition, there is no memory provision for the blinking of the auxiliary light when the vehicle is stopped and the brake pedal is not depressed. Also, this patent actuates red, green and yellow lights to indicate the intention of the driver which can be confusing to the driver of the trailing vehicle. Lastly, this patent does not address the auxiliary light that has become an integral part of currently produced automotive vehicles.

None of the above-mentioned patents employ a means of changing the operation of the auxiliary light from that of operating steady state concurrent with the main brake lights to operating in a flashing mode independent of or concurrent with the main brake lights, but not flashing concurrent with the turn signal lights. Additionally, the above-identified patents lack means of retaining the flashing mode when the brake pedal is released and the car is still at rest with the turn signal inoperative. Also, these patents do not have a provision to alert the driver that the auxiliary light is defective. This deficiency can be seen by observing the number of vehicles that are operating with a defective auxiliary light.

OBJECTS AND ADVANTAGES

It is well known that a flashing light draws immediate attention. For example, flashing of a turn signal light, while the forward vehicle is in motion or stopped, sufficiently alerts other following vehicle operators as to the intent of the forward vehicle being observed. The flashing light sends a message that caution is to be exercised by the following vehicles. Likewise, flashing of the auxiliary light shows the intention of slowing or stopping. This draws attention to the forward vehicle and sends a message that trailing vehicles are to exercise caution with regard to the forward vehicle ahead.

Accordingly, several objects and advantages of my invention are:

1. An improved operation for the auxiliary light is to separate the way it operates from that of the normal operation of the main brake lights. The main brake lights are continuously illuminated for the duration of the application of the brakes or the foot on the brake pedal. One way to cause the auxiliary light to flash is to use the existing turn signal flasher to flash the auxiliary light whenever the brake pedal is depressed. The flashing auxiliary light effectively draws attention of trailing vehicles to the fact that the forward vehicle is slowing or is stopping.

2. To cover the possibility that the vehicle is stopped and the driver has removed the foot from the brake pedal the system is modified. The modification allows the auxiliary light to be an extension of the main brake lights unless both the brake switch and the clutch switch or, optionally, the emission system low speed switch are activated concurrently. In that case, the auxiliary light would enter a flashing mode of operation and remain there until it is removed from that mode by deactivation of both the brake switch and the clutch switch or, optionally, the emission system low speed switch. In this manner, should a driver remove a foot from the brake pedal while the clutch switch or, optionally, the emission system low speed switch remains activated the main brake lights would extinguish but the auxiliary light would keep on flashing. This flashing light would continue to warn a driver of a trailing vehicle to exercise caution with respect to the forward vehicle.

3. One current method for getting the trailing driver's attention that the forward vehicle is taking, or is about to take, an action that will remove it from the flow of traffic or take it to another traffic lane is the turn signal. This information is immediately conveyed to the driver of the trailing vehicle due to the flashing action of the turn signal lamps. To reduce the number of lights that are flashing at any one time, a means of having mutually exclusive actions between the flashing of the auxiliary light and the turn signal lights is desirable in order to minimize distraction. This invention offers a method of changing the mode of operation of the auxiliary light from flashing to that of being steadily on for the duration that the turn signal switch is activated. This ability allows the auxiliary light to operate as an extension of the main brake lights. When the turn signal switch is deactivated, the auxiliary light reverts to the flashing mode of operation and keeps on flashing until the vehicle leaves the stopped or near stopped condition.

4. There is a means of reducing the requirement for entering the flashing mode of operation for the auxiliary light under adverse conditions and a simpler means of determining adverse conditions by monitoring of switch positions rather than use of costly sensors. Under adverse conditions, such as fog, darkness or precipitation, activation of the fog light switch, the headlight switch or the windshield wiper switch reduces the requirement for the auxiliary light to enter the flashing mode to that of simply applying the brakes. All of the switches, with the possible exception of the fog light switch, are standard equipment on motor vehicles. The mutual exclusivity between the flashing of the auxiliary light and the turn signal lights remains. The requirement for leaving the flashing mode, however, remains unchanged to that of requiring deactivation of both the brake pedal and the clutch switch or, optionally, the emission system low speed switch. This advance warning is especially helpful in reduced visibility conditions such as fog, precipitation and darkness.

5. An additional advantage of this system is that the driver becomes alerted to the fact that the auxiliary light is defective when the driver no longer hears the flasher operating during conditions where the auxiliary light should be flashing. For the hearing impaired, an additional light wired in parallel with the auxiliary light can be added to the instrument panel in close proximity to the turn signal indicator lights to display the status of the auxiliary light.

Flashing of the auxiliary light is good for a number of occasions such as bumper-to-bumper traffic. Further, when the forward vehicle is being operated in a manner which could be a danger to a trailing vehicle approaching it from the rear. It is no more undesirable than having a line of cars with their turn signal lights flashing warning approaching drivers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

In the drawings, it is seen that

REFERENCE NUMERALS IN DRAWINGS

| | |
|---|---|
| 10 brake switch | 11 resistor |
| 12 windshield wiper switch | 13 capacitor |
| 14 headlight switch | 15 fog light switch |
| 16 turn signal switch | 17 turn signal flasher |
| 18 clutch switch | 19 emission system low speed switch |
| 20 main brake lights | 21 auxiliary high mount brake light |
| 22 turn signal lights | 23 auxiliary high mount brake light indicator |
| 24 headlights | |
| 28 windshield wiper motor | 26 fog lights |
| 30 field effect transistor (FET) | 29 jumper |
| 33 diode | 32 relay |
| 35 resistor | 34 diode |
| 37 resistor | 36 resistor |
| 39 capacitor | 38 resistor |
| 41 buffer/inverter | 40 2-input NOR gate |
| 43 resistor | 42 2-input AND gate |
| 45 resistor | 44 resistor |
| 47 resistor | 46 flip-flop |
| 49 3-input OR gate | 48 resistor |
| 51 relay | 50 relay |
| 54 diode | 52 diode |
| 56 diode | 55 diode |
| 58 resistor | 57 diode |
| 60 resistor | 59 resistor |
| 62 resistor | 61 resistor |
| 64 diode | 63 resistor |

DESCRIPTION OF THE PREFERRED EMBODIMENT(S)

Referring in detail now to the drawings wherein the vehicle's power source, being derived from the vehicle's battery, is denoted as Vp to which the brake switch 10, the main brake lights 20, the turn signal flasher 17 and turn signal lights 22R and 22L are connected in a conventional manner.

Figure 1:
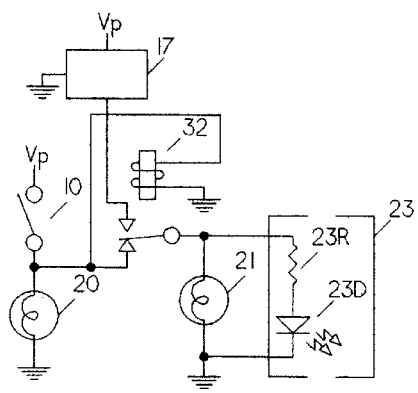
FIG. 1 and 2 illustrates a system where the auxiliary light flashes continuously as long as the brake switch is in a closed position.

With reference to FIG. 1, depressing the brake pedal closes brake switch 10 and connects vehicle power Vp to relay 32. This action activates the relay and connects auxiliary high mount brake light 21 to turn signal flasher 17. The vehicle's main brake lights 20 are on continuously and the auxiliary light 21 operates in a flashing mode. The turn signal flasher 17 is used to generate the flashing mode. Indicator 23 displays the status of the auxiliary light 21.

Figure 2:
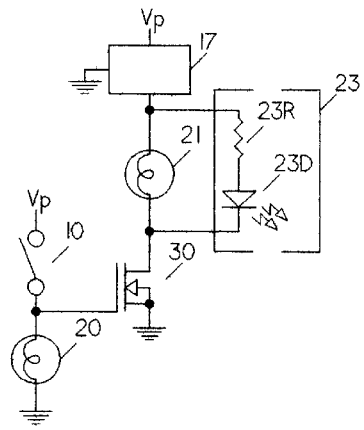

FIG. 2 is operationally similar to FIG. 1 except depressing the brake pedal closes brake switch 10 and connects vehicle power Vp to FET 30. This action turns on the FET which connects one side of auxiliary high mount brake light 21 to ground. The other side of the light is connected to turn signal flasher 17. The vehicle's main brake lights 20 are on continuously and the auxiliary light 21 operates in a flashing mode. The turn signal flasher 17 is used to generate the flashing mode. Indicator 23 displays the status of the auxiliary light 21.

Figure 3:
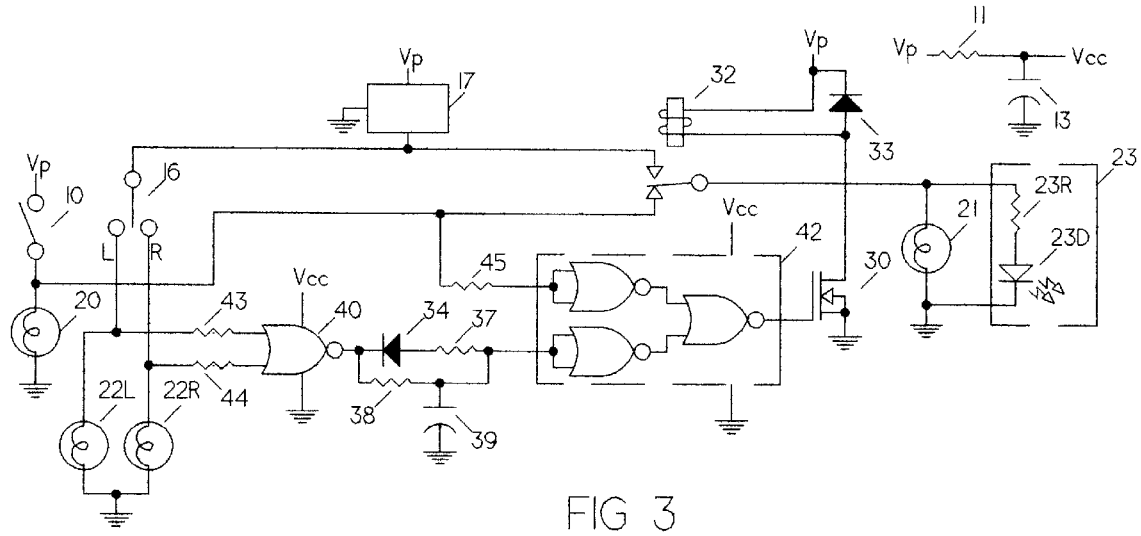
FIG. 3 illustrates a system where the auxiliary light flashes continuously for the duration of the brake switch activation except during the time the turn signal switch is activated wherein the auxiliary light is changed to be an extension of the main brake lights and operates in a non-flashing mode.

The circuit of FIG. 3 places limits on when the auxiliary light operates in a flashing mode. With brake switch 10 closed and the turn signal system inactive, both inputs to 2-input AND gate 42, consisting of three inter-connecting NOR gates, are at a high level. The output of the gate 42, being also at a high level, turns on FET 30. This action connects vehicle power Vp to relay 32 which activates the relay and connects auxiliary high mount brake light 21 to turn signal flasher 17. During the time that the turn signal system is activated, turn signal switch 16 connects either turn signal lights 22R or 22L to the flasher 17 and pulsating high levels are created on the corresponding input of 2-input NOR gate 40. Pulsating low levels at the output of the gate 40 depletes the charge on capacitor 39 via diode 34 and resistor 37 faster than current flowing through resistor 38 can restore the charge. The subsequent low level on the capacitor 39 creates a low level on the output of the AND gate 42. This low level turns off the FET 30, deenergizes the relay 32 and the auxiliary light 21 complements the main brake lights 20. Suppression for the relay 32 is provided by diode 33. Resistors 43, 44 and 45 are used for input protection. Indicator 23 displays the status of the auxiliary light 21. Resistor 11 and capacitor 13 provide filtered Vcc from Vp for gates 40 and 42.

Figure 4:
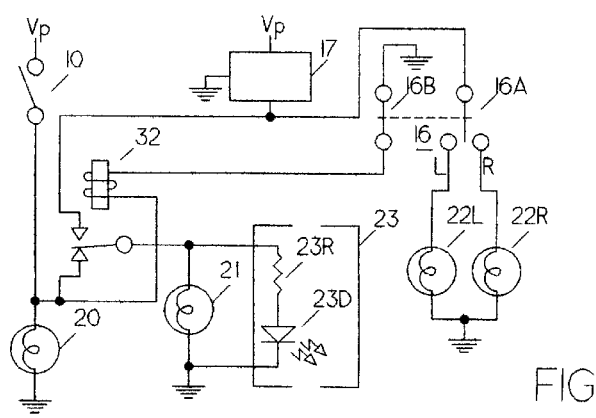
FIG. 4 is operationally similar to FIG. 3 except the means to sense the turn signal activation is accomplished by a turn signal switch rather than use of additional circuitry.

FIG. 4 is operationally similar to FIG. 3 except that a second switch in the turn signal system precludes the requirement for turn signal sensing circuitry. Closing brake switch 10 allows current to flow from vehicle power Vp through turn signal switch 16B to energize relay 32 which connects auxiliary high mount brake light 21 to turn signal flasher 17. During the time that the turn signal system is activated, turn signal switch 16A connects either turn signal lights 22R or 22L to the flasher 17 and switch 16B is open. The relay 32 is not energized and the auxiliary light 21 complements the main brake lights 20. Indicator 23 displays the status of the auxiliary light 21.

Figure 5:
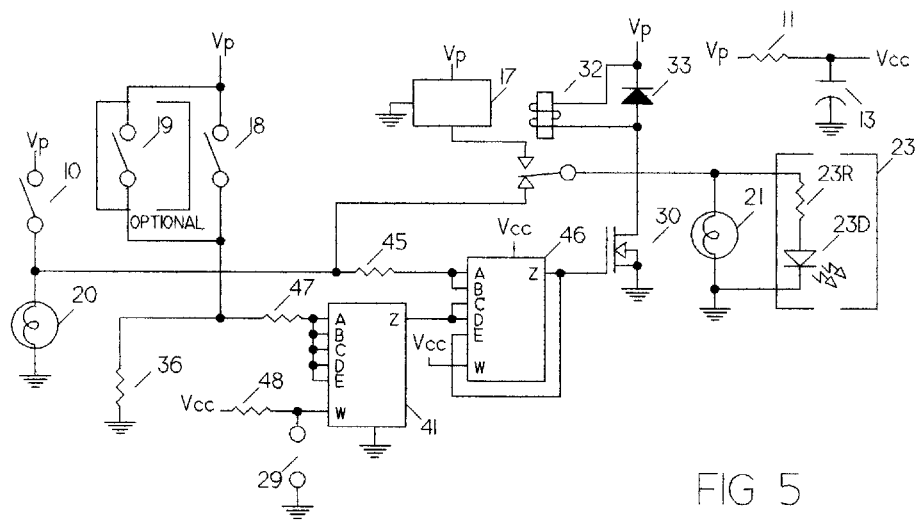
FIG. 5 shows the system where a flip-flop controls the flashing mode of the auxiliary light. The means of latching and unlatching the flip-flop is based on the status of the brake switch and the clutch or, optionally, the emission system low speed switch.

FIG. 5 uses one-half of a dual 5-input majority gate configured as a flip-flop to latch the auxiliary light into a flashing mode. Closing brake switch 10 places a high level at two inputs of flip-flop 46. Closing clutch switch 18 or, optionally, emission system low speed switch 19 places a high level at the input of buffer/inverter 41. With jumper 29 missing, the buffer/inverter, configured from the other half of the dual 5-input majority gate, places two additional high levels at the input of the flip-flop 46 that sets the flip-flop which places a fifth high level on its input. The output of the flip-flop 46, being at a high level, turns on FET 30. This action applies vehicle power Vp to energize relay 32 which connects auxiliary high mount brake light 21 to turn signal flasher 17. Opening both the brake switch 10 and the clutch switch 18 or, optionally, the emission system low speed switch 19 places four low level signals on the inputs of the flip-flop 46 which resets the flip-flop's output to a low level. The low level output places a fifth low level input on the flip-flop, turns off the FET 30, deenergizes the relay 32 and the auxiliary light 21 complements main brake lights 20. Suppression for the relay 32 is provided by diode 33. Resistor 36 and 48 is a pull-down and a pull-up resistor respectively for the buffer/inverter 41. Resistors 45 and 47 are used for input protection. Indicator 23 displays the status of the auxiliary light 21. Should the deactivation state of the clutch switch 18 or, optionally, the emission system low speed switch 19 be normally closed, jumper 29 is installed to invert the signal. Resistor 11 and capacitor 13 provide filtered Vcc from Vp for gates 41 and 46.

Figure 6:
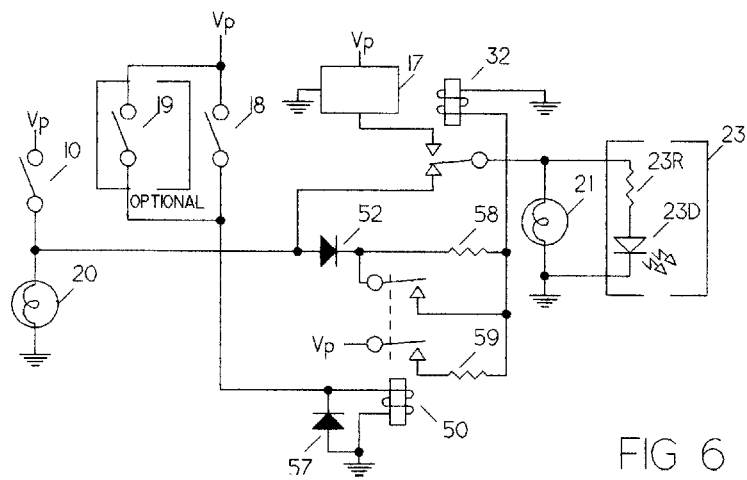
FIG. 6 is operationally similar to FIG. 5 except that the electronic flip-flop is replaced by a relay flip-flop created by using a relay and the contacts of a second relay.

FIG. 6 is operationally similar to FIG. 5 except two relays and two resistors are connected to create a flip-flop to latch the auxiliary light into a flashing mode. Closing clutch switch 18 or, optionally, emission system low speed switch 19 applies vehicle power Vp to energize relay 50. Closing brake switch 10 allows current to flow from vehicle power Vp through diode 52 and the contacts of relay 50 to relay 32. This action energizes the relay 32 which connects auxiliary high mount brake light 21 to turn signal flasher 17. When opening only the clutch switch 18 or, optionally, the emission system low speed switch 19, the relay 50 is deenergized and holding current for the relay 32 flows from the vehicle power Vp through the brake switch 10, the diode 52 and resistor 58. When opening only the brake switch 10, holding current for the relay 32 flows from the vehicle power Vp through the contacts of relay 50 and resistor 59. Opening both the brake switch 10 and the clutch switch 18 or, optionally, the emission system low speed switch 19 deenergizes the relay 32 and the auxiliary light 21 complements main brake lights 20. Suppression for the relay 50 is provided by diode 57. Diode 52 isolates the relay 32 holding current from the main brake lights 20. Resistors 58 and 59 are selected to provide for the holding but not for the activation current for the relay 32. Indicator 23 displays the status of the auxiliary light.

Figure 7:
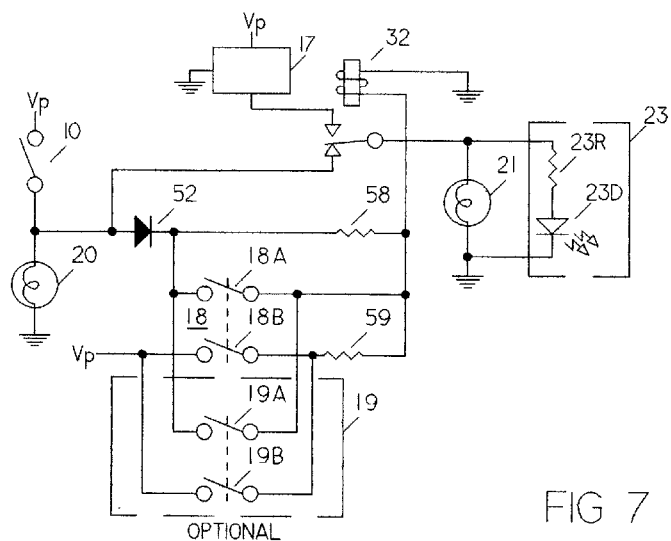
FIG. 7 is operationally similar to FIG. 5 except that the electronic flip-flop is replaced by a relay flip-flop created by using a relay and the contacts of the clutch switch or, optionally the emission system low speed switch.

FIG. 7 is operationally similar to FIG. 5 except the clutch switch or, optionally, the emission system low speed switch, two resistors and a relay are connected to create a flip-flop to latch the auxiliary light into a flashing mode. Closing clutch switch 18 or, optionally, emission system low speed switch 19 and brake switch 10 allows current to flow from vehicle power Vp through diode 52 and switch 18A or, optionally, switch 19A to energize the relay 32. This action connects auxiliary high mount brake light 21 to turn signal flasher 17. When only the clutch switch 18 or, optionally, the emission system low speed switch 19 is open, holding current for the relay 32 flows from the vehicle power Vp through brake switch 10, the diode 52 and resistor 58. When only the brake switch 10 is open, holding current for the relay 32 flows from the vehicle power Vp through switch 18B or, optionally, switch 19B and resistor 59. Opening both the brake switch 10 and the clutch switch 18 or, optionally, the emission system low speed switch 19 deenergizes the relay 32 and the auxiliary light 21 complements main brake lights 20. Diode 52 isolates the relay 32 holding current from the main brake lights 20. Resistors 58 and 59 are selected to provide for the holding but not for the activation current for the relay 32. Indicator 23 displays the status of the auxiliary light.

Figure 8:
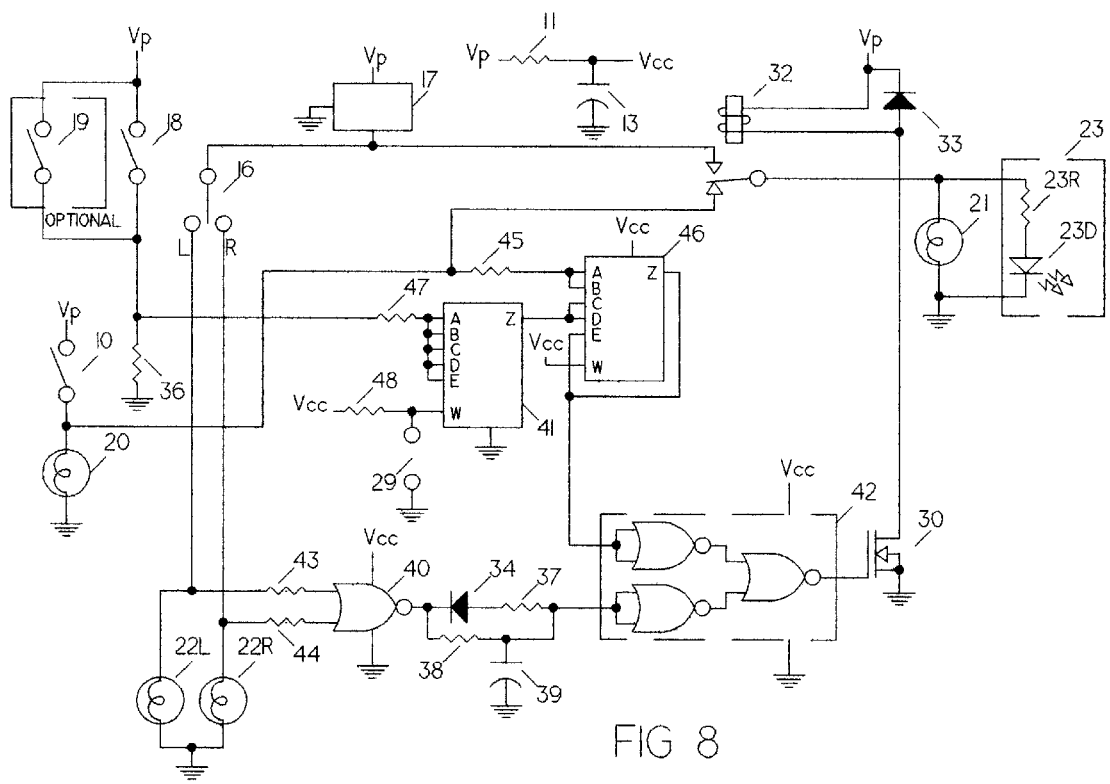
FIG. 8 shows a system combining the flip-flop method shown in FIG. 5 along with the turn signal switch override method shown in FIG. 3.

FIG. 8 is similar to FIG. 5 with one-half of a dual 5-input majority gate configured as a flip-flop but places limits on when the auxiliary light operates in a flashing state. Closing brake switch 10 places a high level at two inputs of flip-flop 46. Closing clutch switch 18 or, optionally, emission system low speed switch 19 places a high level at the input of buffer/inverter 41. With jumper 29 missing, the buffer/inverter, configured from the other half of the dual 5-input majority gate, places two additional high levels at the input of the flip-flop 46 that sets the flip-flop which places a fifth high level on its input. With the flip-flop 46 being set and the turn signal inactive both inputs to 2-input AND gate 42, consisting of three inter-connecting NOR gates, are at a high level. The output of the gate 42, being also at a high level, turns on FET 30. This action applies vehicle power Vp to energize relay 32 which connects auxiliary high mount brake light 21 to turn signal flasher 17. During the time that the turn signal system is activated turn signal switch 16 connects either turn signal lights 22R or 22L to the flasher 17 and pulsating high levels are created on the corresponding input of 2-input NOR gate 40. Pulsating low levels at the output of the gate 40 depletes the charge on capacitor 39 via diode 34 and resistor 37 faster than current flowing through resistor 38 can restore the charge. The subsequent low level on the capacitor 39 creates a low level at the output of the AND gate 42. This low level turns off the FET 30, deenergizes the relay 32 and the auxiliary light 21 complements the main brake lights 20. Opening both the brake switch 10 and the clutch switch 18 or, optionally, the emission system low speed switch 19 places four low level signals on the inputs of the flip-flop 46 which resets the flip-flop's output to a low level. This action places a fifth low level on the flip-flop's input and a low level at the output of the AND gate 42 which turns off the FET 30, deenergizes the relay 32 and the auxiliary light 21 complements the main brake lights 20. Suppression for the relay 32 is provided by diode 33. Resistor 36 and 48 is a pull-down and a pull-up resistor respectively for the buffer/inverter 41. Resistors 43, 44, 45 and 47 are used for input protection. Indicator 23 displays the status of the auxiliary light 21. Should the deactivation state of the clutch switch 18 or, optionally, the emission system low speed switch 19 be normally closed, jumper 29 is installed to invert the signal. Resistor 11 and capacitor 13 provide filtered Vcc from Vp for gates 40, 41, 42 and 46.

Figure 9:
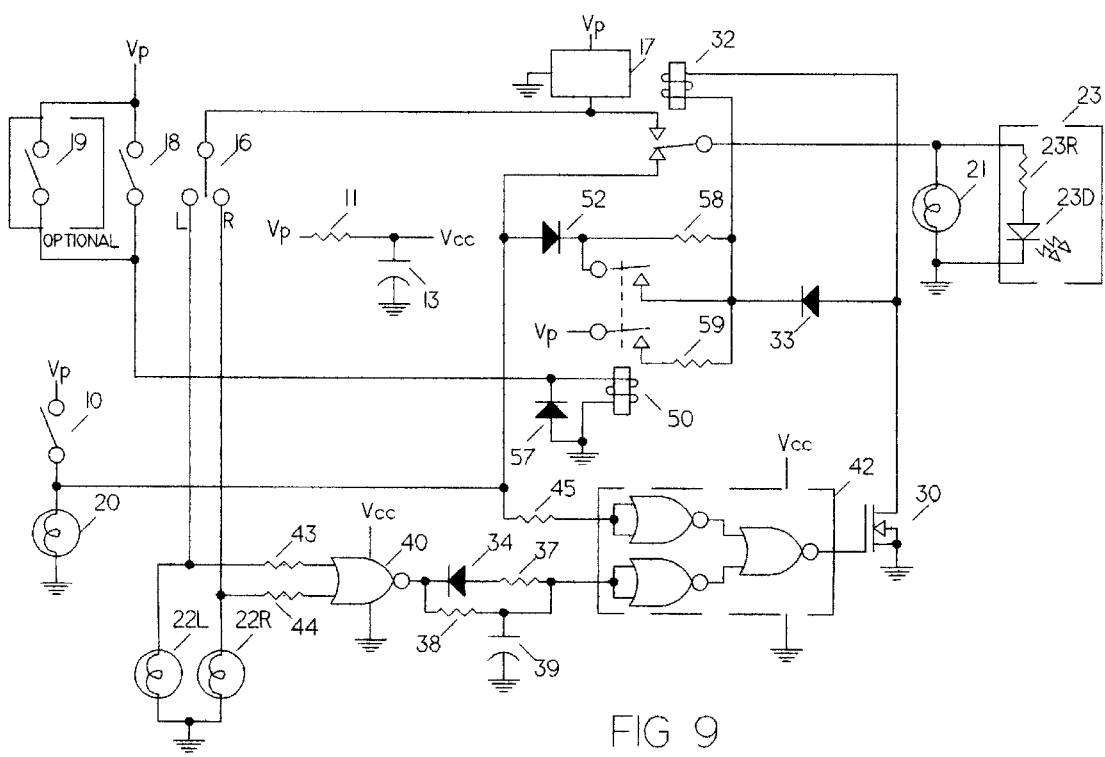
FIG. 9 is operationally similar to FIG. 8 except that the relay flip-flop method of FIG. 6 is used.

FIG. 9 is operationally similar to FIG. 8 except two relays, two resistors and a FET are connected to create a flip-flop to latch the auxiliary light into a flashing mode. Closing clutch switch 18 or, optionally, emission system low speed switch 19, applies vehicle power Vp to energize relay 50. Closing brake switch 10 allows current to flow from vehicle power Vp through diode 52 and the contacts of relay 50 to one end of the coil of relay 32. With the turn signal system inactive both inputs to 2-input AND gate 42, consisting of three inter-connecting NOR gates, are at a high level. The output of the gate 42, being also at a high level, turns on FET 30 which grounds the other end of the coil of the relay 32. This action energizes the relay 32 which connects auxiliary high mount brake light 21 to turn signal flasher 17. During the time that the turn signal system is activated turn signal switch 16 connects either turn signal lights 22R or 22L to the flasher 17 and pulsating high levels are created on the corresponding input of 2-input NOR gate 40. Pulsating low levels at the output of gate 40 depletes the charge on capacitor 39 via diode 34 and resistor 37 faster than current flowing through resistor 38 can restore the charge. The subsequent low level on the capacitor 39 creates a low level at the output of gate 42. This low level turns off the FET 30, deenergizes the relay 32 and the auxiliary light 21 complements main brake lights 20. Opening only the clutch switch 18 or, optionally, the emission system low speed switch 19 deenergizes relay 50 and holding current for the relay 32 flows from the vehicle power Vp through the brake switch 10, the diode 52 and resistor 58. When opening only the brake switch 10, holding current for the relay 32 flows from the vehicle power Vp through the contacts of relay 50 and resistor 59. Opening both the brake switch 10 and the clutch switch 18 or, optionally, the emission system low speed switch 19 deenergizes the relay 32 and the auxiliary light 21 complements the main brake lights 20. Suppression for the relay 50 is provided by diode 57. Suppression for the relay 32 is provided by diode 33. The diode 52 isolates the relay 32 holding current from the main brake lights 20. Resistors 58 and 59 are selected to provide for the holding but not for the activation current for the relay 32. Resistors 43, 44 and 45 are used for input protection. Indicator 23 displays the status of the auxiliary light. Resistor 11 and capacitor 13 provide filtered Vcc from Vp for gates 40 and 42.

Figure 10:
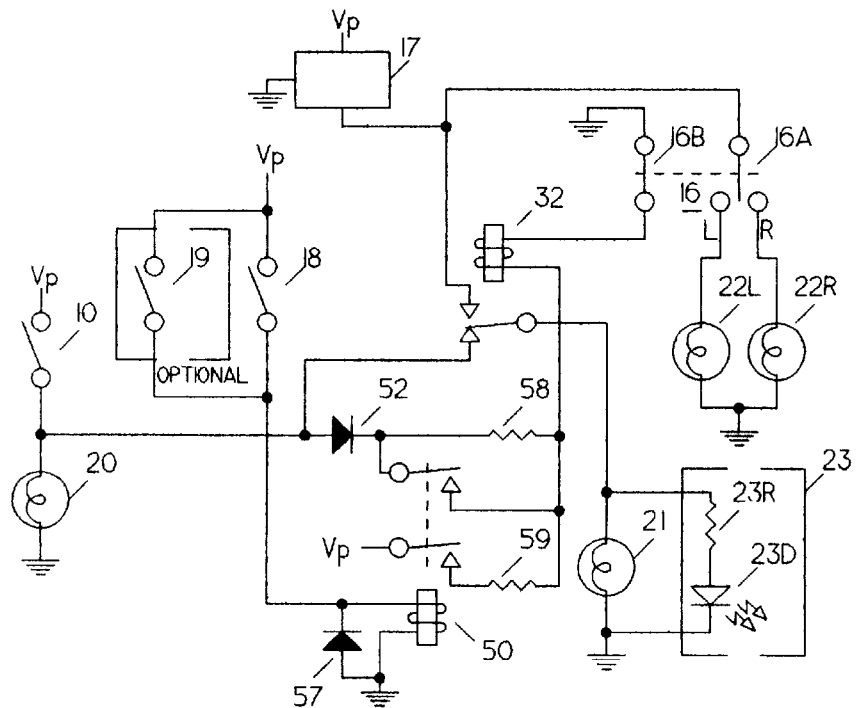
FIG. 10 is operationally similar to FIG. 9 except that the turn signal switch override method of FIG. 4 is used.

FIG. 10 is operationally similar to FIG. 9 except a second switch in the turn signal lever precludes the requirement for turn signal sensing circuitry. Closing clutch switch 18 or, optionally, emission system low speed switch 19 energizes relay 50. Closing brake switch 10 allows current to flow from vehicle power Vp through diode 52, the contacts of the relay 50 and turn signal switch 16B. This action energizes the relay 32 which connects auxiliary high mount brake light 21 to turn signal flasher 17. During the time that the turn signal system is activated, turn signal switch 16A connects either turn signal lights 22R or 22L to the flasher 17, switch 16B is open, relay 32 is not energized and the auxiliary light 21 complements main brake lights 20. Opening only the clutch switch 18 or, optionally, the emission system low speed switch 19 deenergizes relay 50 and holding current for the relay 32 flows from the vehicle power Vp through the brake switch 10, the diode 52 and resistor 58. When opening only the brake switch 10, holding current for the relay 32 flows from the vehicle power Vp through the contacts of relay 50 and resistor 59. Opening both the brake switch 10 and the clutch switch 18 or, optionally, the emission system low speed switch 19 deenergizes the relay 32 and the auxiliary light 21 complements the main brake lights 20. Suppression for the relay 50 is provided by diode 57. The diode 52 isolates the relay 32 holding current from the main brake lights 20. Resistors 58 and 59 are selected to provide for the holding but not for the activation current for the relay 32. Indicator 23 displays the status of the auxiliary light.

Figure 11:
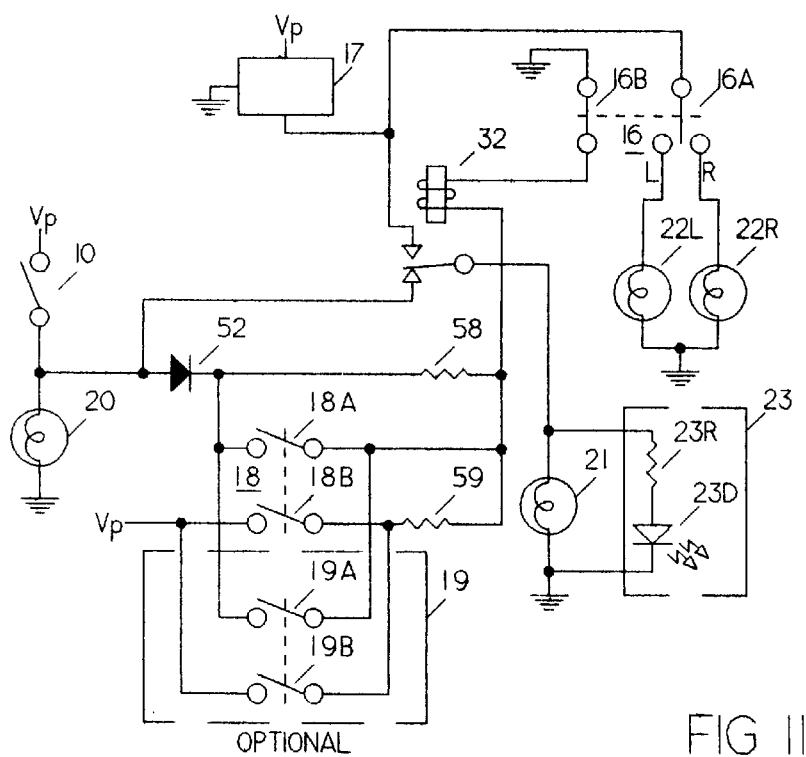
FIG. 11 is operationally similar to FIG. 10 except that the relay flip-flop method of FIG. 7 is used.

FIG. 11 is operationally similar to FIG. 10 except the clutch switch or, optionally, the emission system low speed switch, two resistors and a relay are connected to create a flip-flop to latch the auxiliary light into a flashing mode. Closing clutch switch 18 or, optionally, emission system low speed switch 19 and brake switch 10 allows current to flow from vehicle power Vp through diode 52, switch 18A or, optionally, switch 19A and the turn signal switch 16B. This action energizes the relay 32 which connects auxiliary high mount brake light 21 to turn signal flasher 17. During the time that the turn signal system is activated, turn signal switch 16A connects either turn signal lights 22R or 22L to the flasher 17, switch 16B is open, relay 32 is not energized and the auxiliary light 21 complements the main brake lights 20. When only the clutch switch 18 or, optionally, the emission system low speed switch 19 is opened, holding current for the relay 32 flows from the vehicle power Vp through the brake switch 10, the diode 52, resistor 58 and switch 16B. When opening only the brake switch 10, holding current for the relay 32 flows from the vehicle power Vp through switch 18B or, optionally, switch 19B, resistor 59 and switch 16B. Opening both the brake switch 10 and the clutch switch 18 or, optionally, the emission system low speed switch 19 deenergizes the relay 32 and the auxiliary light 21 complements the main brake lights 20. Diode 52 isolates the relay 32 holding current from the main brake lights 20. Resistors 58 and 59 are selected to provide for the holding but not for the activation current for the relay 32. Indicator 23 displays the status of the auxiliary light.

Figure 12:
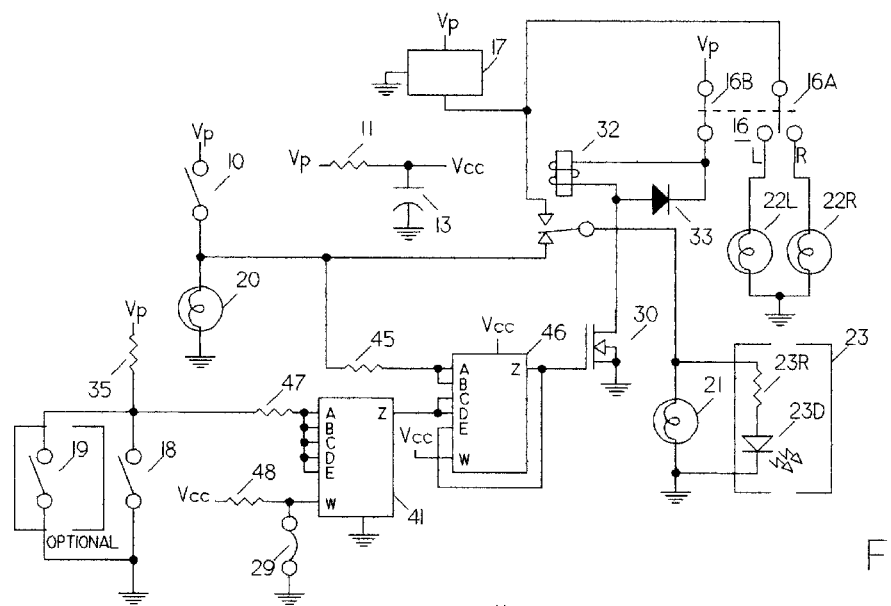
FIG. 12 is operationally similar to FIG. 8 except for using the turn signal switch override method shown in FIG. 4.

FIG. 12 is operationally similar to FIG. 8 with one-half of a dual 5-input majority gate configured as a flip-flop except that a second switch in the turn signal lever precludes the requirement for turn signal sensing circuitry. Closing brake switch 10 places a high level at two inputs of flip-flop 46. Closing clutch switch 18 or, optionally, emission system low speed switch 19 places a low level at the input of buffer/inverter 41. With jumper 29 installed, the buffer/inverter, configured from the other half of the dual 5-input majority gate, places two additional high levels at the input of the flip-flop 46 that sets the flip-flop which places a fifth high level on its input. The output of the flip-flop 46, being at a high level, turns on FET 30. This action applies vehicle power Vp through switch 16B to energize relay 32 which then connects auxiliary high mount brake light 21 to turn signal flasher 17. During the time that the turn signal system is activated, turn signal switch 16A connects either turn signal lights 22R or 22L to the flasher 17, switch 16B is open, the relay 32 is deenergized and the auxiliary light 21 complements main brake lights 20. Opening both the brake switch 10 and the clutch switch 18 or, optionally, the emission system low speed switch 19 places four low level signals at the inputs of the flip-flop 46 which resets the flip-flop's output to a low level. This action places a fifth low level on its input, turns off the FET 30, deenergizes the relay 32 and the auxiliary light 21 complements the main brake lights 20. Suppression for the relay 32 is provided by diode 33. Resistors 35 and 48 are pull-up resistors for the buffer/inverter 41. Resistors 45 and 47 are used for input protection. Indicator 23 displays the status of the auxiliary light 21. Should the deactivation state of the clutch switch 18 or, optionally, the emission system low speed switch 19 be normally closed, jumper 29 is not used and the signal through the buffer/inverter 41 is not inverted. Resistor 11 and capacitor 13 provide filtered Vcc from Vp for gates 41 and 46.

Figure 13:
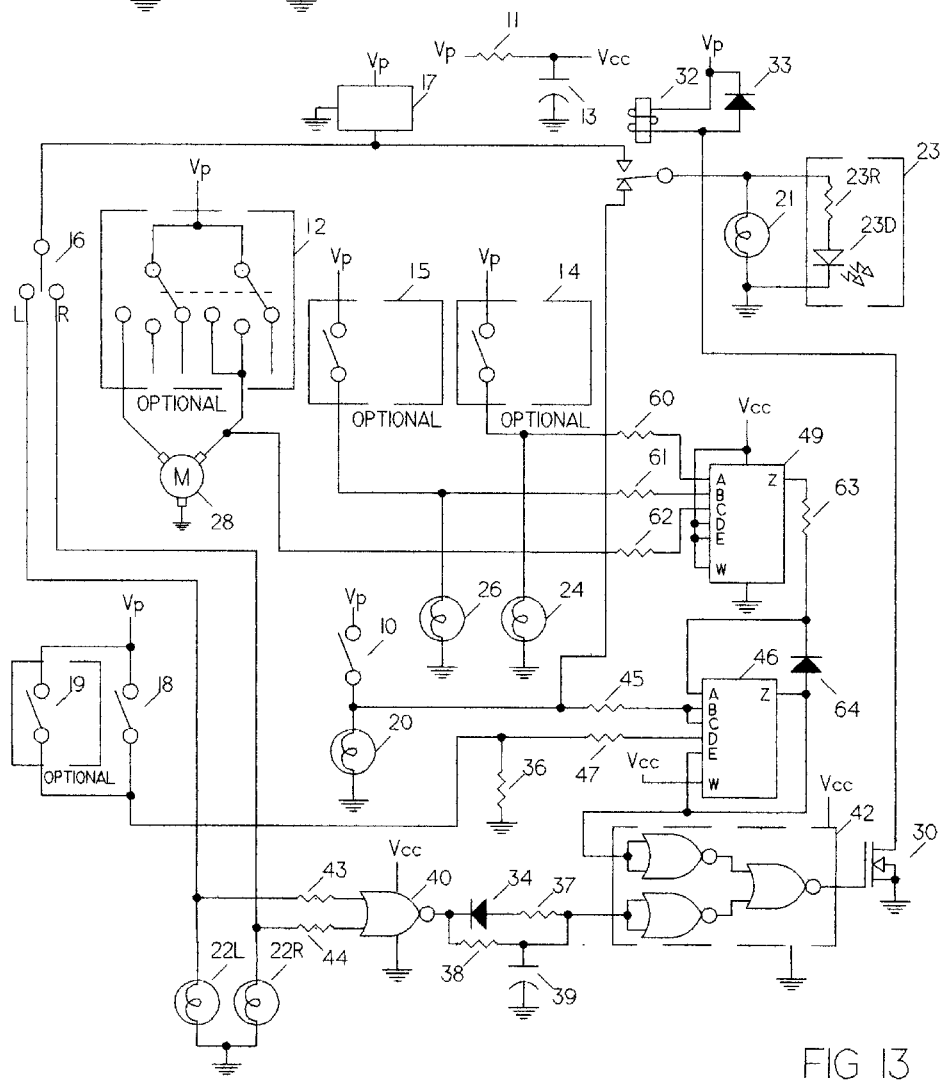
FIG. 13 shows a system that simplifies the latching requirements of FIG. 8 to that of activation of only the brake switch during adverse conditions. Requirements for unlatching remains unchanged.

FIG. 13 is similar to FIG. 8 with one-half of a dual 5-input majority gate configured as a flip-flop except setting the flip-flop, during adverse conditions, can be accomplished by depressing only the brake pedal. Requirements for resetting the flip-flop remains unchanged. During adverse conditions, activation of windshield wiper switch 12 which turns on windshield wiper motor 28, headlight switch 14 which turns on headlights 24 or fog light switch 15 which turns on fog lights 26 and places a high level at the output of 3-input OR gate 49, configured from the other half of the dual 5-input majority gate. Without adverse conditions present, closing brake switch 10 places two high levels at the input of flip-flop 46. Closing clutch switch 18 or, optionally, emission system low speed switch 19 places a third high level at its input. This action sets the flip-flop and its output, being at a high level, places a fourth high level, via diode 64, and a fifth high level on its input. With adverse conditions present, the output of 3-input OR gate 49, being at a high level, places a high level at the input of the flip-flop via resistor 63. Closing brake switch 10 places two additional high levels at the input of the flip-flop which sets the flip-flop whose output, being at a high level, places a fourth high level at its input. With the flip-flop being set and with the turn signal system inactive both inputs to 2-input AND gate 42, consisting of three inter-connecting NOR gates, are at a high level. The output of the gate 42, being also at a high level, turns on FET 30 which applies vehicle power Vp to energize relay 32. This connects auxiliary high mount brake light 21 to turn signal flasher 17. During the time that the turn signal system is activated, turn signal switch 16 connects either turn signal lights 22R or 22L to the flasher 17, pulsating high levels are created on the corresponding input of 2-input NOR gate 40. Pulsating low levels at the output of the gate 40 depletes the charge on capacitor 39 via diode 34 and resistor 37 faster than current flowing through resistor 38 can restore the charge. The subsequent low level on the capacitor 39 creates a low level at the output of gate 42. This low level turns off the FET 30, deenergizes the relay 32 and the auxiliary light 21 complements main brake lights 20. Opening both the brake switch 10 and the clutch switch 18 or, optionally, the emission system low speed switch 19 places three low level signals at the inputs of the flip-flop 46. This resets the flip-flop output to a low level, places a fourth and, without adverse conditions, a fifth low level at its input, deenergizes the relay 32 and the auxiliary light 21 complements the main brake lights 20. Suppression for the relay 32 is provided by diode 33. Resistors 43, 44, 45, 47, 60, 61 and 62 are used for input protection. Resistor 36 is a pull-down resistor for flip-flop 46. Resistor 63 and diode 64 is an isolation resistor and an isolation diode respectively for OR gate 49. Indicator 23 displays the status of the auxiliary light. Resistor 11 and capacitor 13 provide filtered Vcc from Vp for gates 40, 42, 46 and 49.

Figure 14:
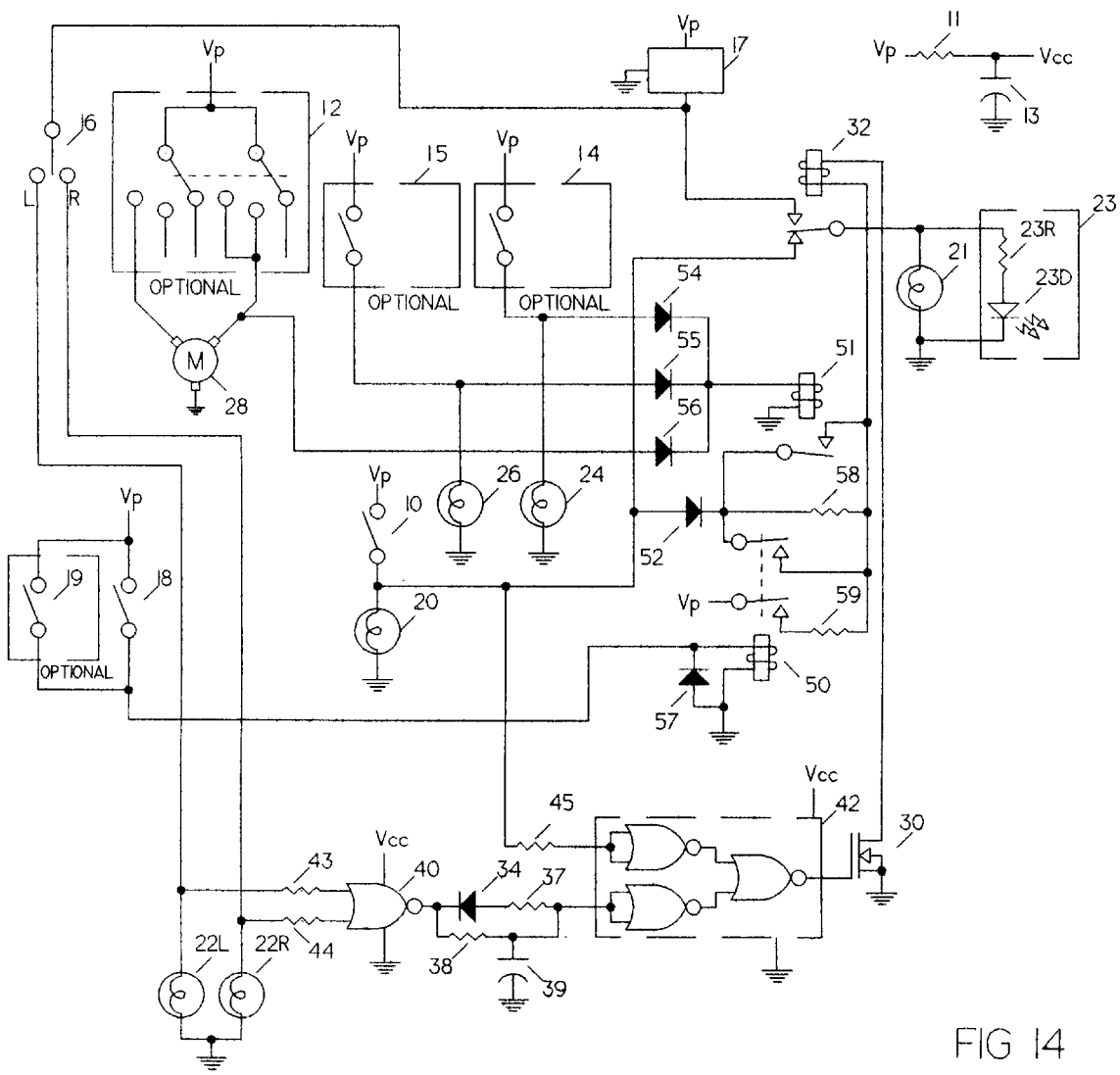
FIG. 14 is operationally similar to FIG. 13 except that the relay flip-flop method of FIG. 6 combined with a third relay is used.

FIG. 14 is operationally similar to FIG. 13 except three relays, two resistors and a FET are connected to create a flip-flop to latch the auxiliary light into a flashing mode. During adverse conditions, activation of windshield wiper switch 12 which turns on windshield wiper motor 28, headlight switch 14 which turns on headlights 24 or fog light switch 15 which turns on fog lights 26 will apply vehicle power Vp to energize relay 51. Closing clutch switch 18 or, optionally, emission system low speed switch 19 applies vehicle power Vp to energize relay 50. Closing brake switch 10 allows current to flow from vehicle power Vp through diode 52 and the contacts of relay 50 or, during adverse conditions, the contacts of relay 51 to one end of the coil of relay 32. With the turn signal system inactive both inputs to 2-input AND gate 42, consisting of three inter-connecting NOR gates, are at a high level. The output of the gate 42, being also at a high level, turns on FET 30 which grounds the other end of the coil of the relay 32. This action energizes the relay 32 which connects auxiliary high mount brake light 21 to turn signal flasher 17. During the time that the turn signal system is activated, the turn signal switch 16 connects either turn signal lights 22R or 22L to the flasher 17. This creates pulsating high levels on the corresponding input of 2-input NOR gate 40. Pulsating low levels at the output of the gate 40 depletes the charge on capacitor 39 via diode 34 and resistor 37 faster than current flowing through resistor 38 can restore the charge. The subsequent low level on the capacitor 39 creates a low level at the output of the 2-input AND gate 42. This turns off the FET 30, deenergizes the relay 32 and the auxiliary light 21 complements main brake lights 20. When only the clutch switch 18 or, optionally, the emission system low speed switch 19 is opened, holding current for the relay 32 flows from the vehicle power Vp through the brake switch 10, the diode 52, resistor 58, or, during adverse conditions, the contacts of relay 51 and FET 30. When opening only the brake switch 10, holding current for the relay 32 flows from the vehicle power Vp through the contacts of relay 50, resistor 59 and FET 30. Opening both the brake switch 10 and the clutch switch 18 or, optionally, the emission system low speed switch 19 deenergizes relay 32 and the auxiliary light 21 complements the main brake lights 20. Suppression for the relay 50 is provided by diode 57. The diode 52 isolates the relay 32 holding current from the main brake lights 20. Diodes 54, 55, and 56 isolate the headlight switch 14, the fog light switch 15 and the windshield wiper switch 12 from each other. Resistors 43, 44 and 45 are used for input protection. Resistors 58 and 59 are selected to provide for the holding but not for the activation current for the relay 32. Indicator 23 displays the status of the auxiliary light. Resistor 11 and capacitor 13 provide filtered Vcc from Vp for gates 40 and 42.

Figure 15:
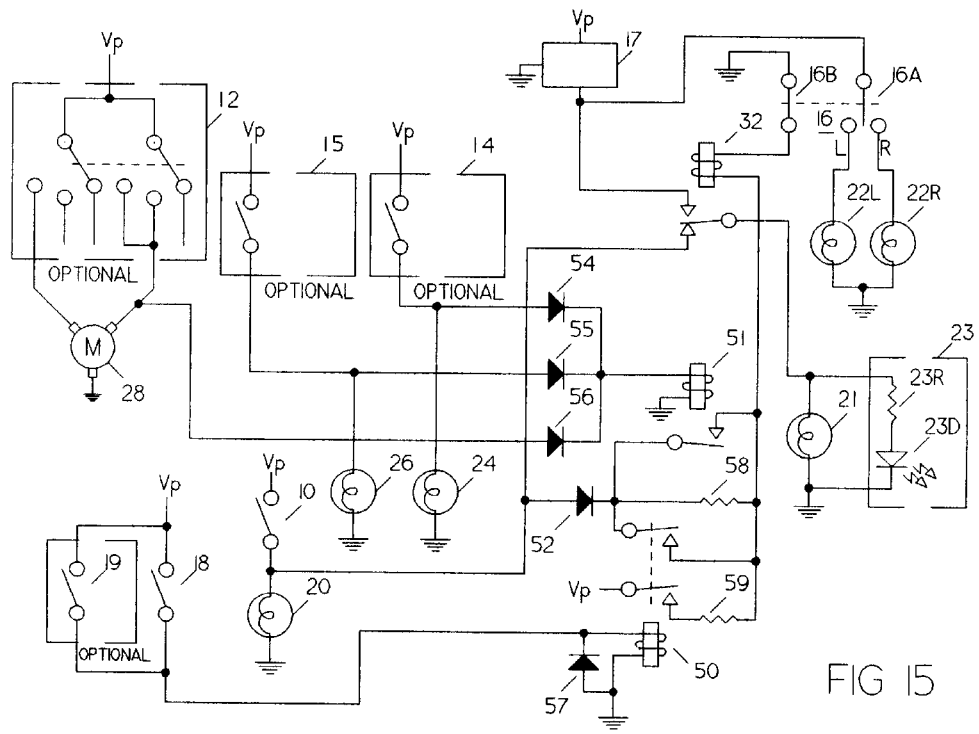
FIG. 15 is operationally similar to FIG. 14 except that the turn signal switch override method of FIG. 4 is used.

FIG. 15 is operationally identical to FIG. 14 except that a second switch in the turn signal lever precludes the requirement for turn signal sensing circuitry. During adverse conditions, activation of windshield wiper switch 12 which turns on windshield wiper motor 28, headlight switch 14 which turns on headlights 24 or fog light switch 15 which turns on fog lights 26 will apply vehicle power Vp to energize relay 51. Closing clutch switch 18 or, optionally, emission system low speed switch 19 applies vehicle Vp to energize relay 50. Closing brake switch 10 allows current to flow from vehicle power Vp through diode 52, the contacts of the relay 50 or, during adverse conditions, the contacts of the relay 51 and the turn signal switch 16B. This action energizes the relay 32 which connects auxiliary high mount brake light 21 to turn signal flasher 17. During the time that the turn signal system is activated, turn signal switch 16A connects either turn signal light 22R or 22L to the flasher 17, switch 16B is open, relay 32 is not energized and the auxiliary light 21 complements main brake lights 20. Opening only the clutch switch 18 or, optionally, the emission system low speed switch 19 deenergizes the relay 50 and holding current for the relay 32 flows from the vehicle power Vp through the brake switch 10, the diode 52, resistor 58, or, during adverse conditions, the contacts of relay 51, and switch 16B. When opening only the brake switch 10, holding current for the relay 32 flows from the vehicle power Vp through the contacts of relay 50, resistor 59 and switch 16B. Opening both the brake switch 10 and the clutch switch 18 or, optionally, the emission system low speed switch 19 deenergizes the relay 32 and the auxiliary light 21 complements the main brake lights 20. Suppression for the relay 50 is provided by diode 57. The diode 52 isolates the relay 32 holding current from the main brake lights 20. Diodes 54, 55 and 56 isolate the headlight switch 14, the fog light switch 15 and the windshield wiper switch 12 from each other. Resistors 58 and 59 are selected to provide for the holding but not for the activation current for the relay 32. Indicator 23 displays the status of the auxiliary light.

Figure 16:
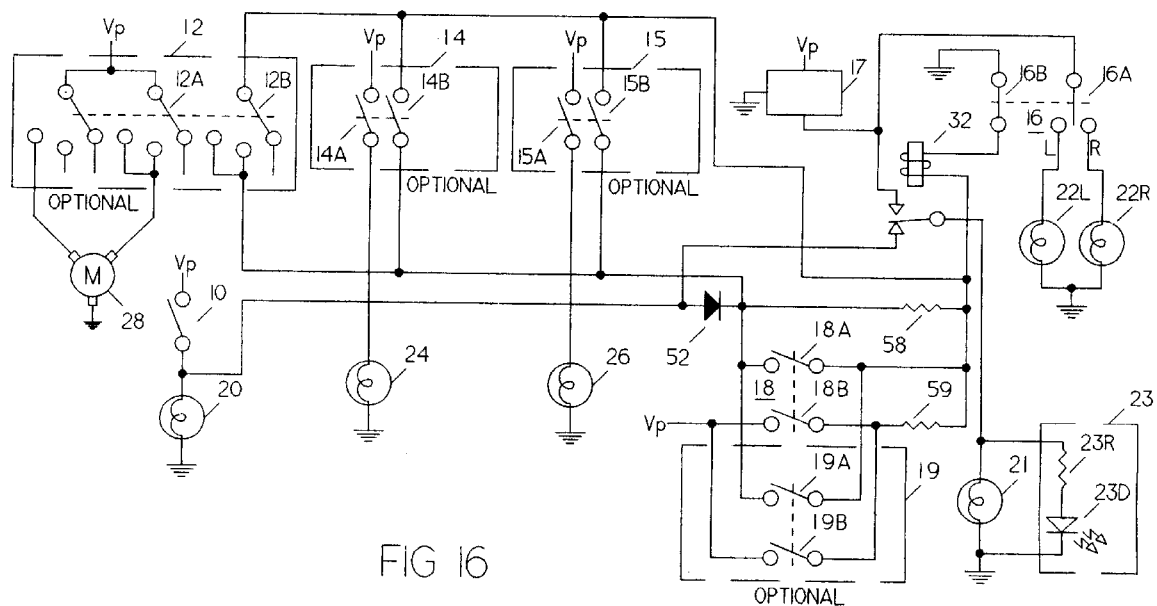
FIG. 16 is operationally similar to FIG. 15 except that the relay flip-flop method of FIG. 7 is used.

FIG. 16 is operationally similar to FIG. 15 except the headlight switch, the fog light switch and/or the windshield wiper switch is connected in parallel to the clutch switch or, optionally, the emission system low speed switch. During adverse conditions, activation of windshield wiper switch 12 which turns on windshield wiper motor 28, headlight switch 14 which turns on headlights 24 or fog light switch 15 which turns on fog lights 26 closes switch 12B, switch 14B or switch 15B respectively which are connected in parallel to switch 18A or, optionally, switch 19A. Closing clutch switch 18 or, optionally, emission system low speed switch 19 and brake switch 10 allows current to flow from vehicle power Vp through diode 52, switch 18A or, optionally, switch 19A and turn signal switch 16B. During adverse conditions, closing only brake switch 10 allows the same current to flow alternately through diode 52 and switch 12B, 14B or 15B. This action energizes relay 32 which connects auxiliary high mount brake light 21 to turn signal flasher 17. During the time that the turn signal system is activated, turn signal switch 16A connects either turn signal lights 22R or 22L to the flasher 17, switch 16B is open, relay 32 is not energized and the auxiliary light 21 complements main brake lights 20. Opening only the clutch switch 18 or, optionally, the emission system low speed switch 19 deenergizes the relay 50 and holding current for the relay 32 flows from the vehicle power Vp through the brake switch 10, the diode 52, resistor 58 or, during adverse conditions, switch 12B, 14B or 15B, and switch 16B. When opening only the brake switch 10, holding current for the relay 32 flows from the vehicle power Vp through switch 18B or, optionally switch 19B, resistor 59 and switch 16B. Opening both the brake switch 10 and the clutch switch 18 or, optionally, the emission system low speed switch 19 deenergizes the relay 32 and the auxiliary light 21 complements the main brake lights 20. Diode 52 isolates the relay 32 holding current from the main brake lights 20. Resistors 58 and 59 are selected to provide for the holding but not for the activation current for the relay 32. Indicator 23 displays the status of the auxiliary light.

What I claim is:

1. An improved brake light circuit for an automotive vehicle comprising an auxiliary high mount brake light:

a. a power source Vp, having a first low voltage side and a first high voltage side;

b. an auxiliary high mount brake light operatively connecting with said power source;

c. a brake switch operatively connecting with said power source;

d. a turn signal flasher operatively connecting with said power source;

e. said turn signal flasher having an output;

f. a turn signal switch operatively connecting with said turn signal flasher output and with said power source;

g. a first means for operatively connecting said auxiliary light to said flasher output for continuously flashing said auxiliary light and for operatively disconnecting said auxiliary light from said flasher output;

h. an isolation means operatively connecting with said first means and with said turn signal switch and with said brake switch for isolating said auxiliary high mount brake light from said flasher output for precluding the flashing mode of illumination of said auxiliary brake light for the duration of time that said turn signal switch is activated; and i. said brake switch operatively connecting with said first means.

2. A brake light circuit according to claim 1 and comprising:

a. said first means comprising a relay; and b. said first means for operatively connecting said turn signal flasher output to said auxiliary light for flashing said auxiliary light for the duration of time that said brake switch is closed.

3. A brake light circuit according to claim 1 and comprising:

a. said first means comprising a relay;

b. said auxiliary high mount brake light operatively connecting with said turn signal flasher output; and c. said first means for operatively connecting said first low voltage side to said auxiliary high mount brake light for flashing said auxiliary light for the duration of time that said brake switch is closed.

4. A brake light circuit according to claim 1 and comprising:

a. said first means comprising a relay;

b. said isolation means comprising a NOR-gate operatively connecting with an AND-gate;

c. said turn signal switch operatively connecting with said NOR-gate;

d. said AND-gate operatively connecting with said brake switch;

e. said AND-gate operatively connecting with a FET;

f. said FET operatively connecting with said first low voltage side;

g. said relay operatively connecting with said FET and with said first high voltage side;

h. said power source operatively connecting with said AND-gate and with said NOR-gate;

i. with said brake switch being closed and with said turn signal switch in an inactive state not connecting with said NOR-gate said AND-gate output is high and said FET is conducting and said relay is energized and said auxiliary light is connected to said turn signal flasher output and said auxiliary light is flashing; and j. with said brake switch being closed and with said turn signal switch in an active state said AND-gate output is low and said FET is not conducting and said relay is not energized and said auxiliary light is connected to said brake switch and said auxiliary light is an extension of the main brake lights.

5. A brake light circuit according to claim 1 and comprising:

a. said first means comprising a relay;

b. said isolation means comprising a switch;

c. said switch operatively connecting with said first low voltage side and with said relay;

d. with said brake switch being closed and with said turn signal switch in an inactive state said switch is closed and said relay is energized and said auxiliary light is connected to said turn signal flasher output and said auxiliary light is flashing; and e. with said brake switch being closed and with said turn signal switch in an active state said switch is open and said relay is not energized and said auxiliary light is connected to said brake switch and said auxiliary light is an extension of the main brake lights.

6. A brake light circuit according to claim 1 and comprising:

a. a second means for operatively connecting said auxiliary high mount brake light to said turn signal flasher;

b. said second means being set for connecting said auxiliary light to said flasher output when said brake switch and a third means are activated concurrently for indicating that said brake switch is closed and the automotive vehicle is operating at less than a predetermined velocity;

c. said second means being reset for disconnecting said auxiliary light from said flasher output when said brake switch and said third means are deactivated concurrently for indicating that said brake switch is open and said automotive vehicle is operating above said predetermined velocity; and d. said second means and said third means operatively connecting with said power source.

7. A brake light circuit according to claim 6 and comprising:

a. said first means comprising a relay;

b. said second means comprising a flip-flop;

c. said third means comprising an emission system low speed switch;

d. said third means and said brake switch operatively connecting with said flip-flop;

e. said flip-flop operatively connecting with a FET;

f. said FET operatively connecting with said first low voltage side;

g. said relay operatively connecting with said FET and with said first high voltage side;

h. with said flip-flop being set said FET is conducting and said relay is energized and said auxiliary light is connected to said turn signal flasher output and said auxiliary light is flashing; and i. with said flip-flop being reset said FET is not conducting and said relay is not energized and said auxiliary light is connected to said brake switch and said auxiliary light is an extension of the main brake lights.

8. A brake light circuit according to claim 6 and comprising:

a. said first means comprising a first relay;

b. said second means comprising a second relay operatively connecting with said first relay to form a memory device;

c. said third means comprising an emission system low speed switch;

d. said third means and said brake switch operatively connecting with said memory device;

e. with said memory device being set said first relay is energized and said auxiliary light high voltage side is connected to said turn signal flasher output and said auxiliary light is flashing; and f. with said memory device being reset said first relay is not energized and said auxiliary light is connected to said brake switch and said auxiliary light is an extension of the main brake lights.

9. A brake light circuit according to claim 6 and comprising:

a. said first means comprising a relay;

b. said second means comprising said third means operatively connecting with said relay to form a memory device;

c. said third means comprising an emission system low speed switch;

d. said memory device operatively connecting with said brake switch;

e. with said memory device being set said relay is energized and said auxiliary light is connected to said turn signal flasher output and said auxiliary light is flashing; and f. with said memory device being reset said relay is not energized and said auxiliary light is connected to said brake switch and said auxiliary light is an extension of the main brake lights.

10. A brake light circuit according to claim 6 wherein:

said isolation means operatively connecting with said first means and with said second means and with said turn signal switch for isolating said auxiliary high mount brake light from said flasher for precluding the flashing mode of illumination of said auxiliary brake light for the duration of time that said turn signal switch is activated.

11. A brake light circuit according to claim 10 and comprising:

a. said first means comprising a relay;

b. said second means comprising a flip-flop;

c. said third means comprising an emission system low speed switch:

d. said third means and said brake switch operatively connecting with said flip-flop;

e. said isolation means comprising a NOR-gate operatively connecting with an AND-gate:

f. said turn signal switch operatively connecting with said NOR-gate;

g. said AND-gate operatively connecting with said flip-flop;

h. said AND-gate operatively connecting with a FET;

i. said FET operatively connecting with said first low voltage side;

j. said relay operatively connecting with said FET and with said first high voltage side;

k. said power source operatively connecting with said NOR-gate and with said AND-gate;

l. with said flip-flop being set and with said turn signal switch in an inactive state not connecting with said NOR-gate said AND-gate output is high and said FET is conducting and said relay is energized and said auxiliary light is connected to said turn signal flasher output and said auxiliary light is flashing; and m. with said flip-flop being set and with said turn signal switch in an active state said AND-gate output is low and said FET is not conducting and said relay is not energized and said auxiliary light is connected to said brake switch and said auxiliary light is an extension of the main brake lights.

12. A brake light circuit according to claim 10 and comprising:

a. said first means comprising a first relay;

b. said second means comprising a second relay operatively connecting with said first relay to form a memory device;

c. said third means comprising an emission system low speed switch;

d. said third means and said brake switch operatively connecting with said memory device;

e. said isolation means comprising a NOR-gate operatively connecting with an AND-gate;

f. said turn signal switch operatively connecting with said NOR-gate;

g. said AND-gate operatively connecting with said memory device;

h. said AND-gate operatively connecting with a FET;

i. said FET operatively connecting with said first low voltage side;

j. said memory device connecting with said FET and with said first high voltage side;

k. said brake switch operatively connecting with said AND-gate;

l. said power source operatively connecting with said NOR-gate and with said AND-gate;

m. with said memory device being set and with said turn signal switch in an inactive state not connecting with said NOR-gate said AND-gate output is high and said FET is conducting and said first relay is energized and said auxiliary light is connected to said turn signal flasher output and said auxiliary light is flashing; and n. with said memory device being set and with said turn signal switch in an active state said AND-gate output is low and said FET is not conducting and said first relay is not energized and said auxiliary light is connected to said brake switch and said auxiliary light is an extension of the main brake lights.

13. A brake light circuit according to claim 10 and comprising:

a. said first means comprising a first relay;

b. said second means comprising a second relay operatively connecting with said first relay to form a memory device;

c. said third means comprising an emission system low speed switch;

d. said third means and said brake switch operatively connecting with said memory device;

e. said isolation means comprising a switch operatively connecting with said first low voltage side and with said memory device;

f. with said memory device being set and with said turn signal switch in an inactive state said switch is closed and said first relay is energized and said auxiliary light is connected to said turn signal flasher output and said auxiliary light is flashing; and g. with said turn signal switch in an active state said switch is open and said first relay is not energized and said auxiliary light is connected to said brake switch and said auxiliary light is an extension of the main brake lights.

14. A brake light circuit according to claim 10 and comprising:
   a. said first means comprising a relay;
   b. said second means comprising said third means operatively connecting with said relay to form a memory device;
   c. said third means comprising an emission system low speed switch;
   d. said memory device operatively connecting with said brake switch;
   e. said isolation means comprising a switch operatively connecting said first low voltage side with said memory device;
   f. with said memory device being set and with said turn signal switch in an inactive state said switch is closed and said relay is energized and said auxiliary light is connected to said turn signal flasher output and said auxiliary light is flashing; and
   g. with said turn signal switch in an active state said switch is open and said relay is not energized and said auxiliary light is connected to said brake switch and said auxiliary light is an extension of the main brake lights.

15. A brake light circuit according to claim 10 and comprising:
   a. said first means comprising a relay;
   b. said second means comprising a flip-flop;
   c. said third means comprising an emission system low speed switch;
   d. said third means and said brake switch operatively connected to said flip-flop;
   e. said flip-flop operatively connecting with a FET;
   f. said FET operatively connecting with said first low voltage side and with said first means;
   g. said isolation means comprising a switch operatively connecting with said first high voltage side and with said relay;
   h. with said flip-flop being set and with said turn signal switch in an inactive state said switch is closed and said relay is energized and said auxiliary light is connected to said turn signal flasher output and said auxiliary light is flashing; and
   i. with said flip-flop being set and with said turn signal switch in an active state said switch is open and said relay is not energized and said auxiliary light is connected to said brake switch and said auxiliary light is an extension of the main brake lights.

16. A brake light circuit according to claim 10 and comprising:
   a. said second means being set for connecting said auxiliary light to said flasher output when said brake switch and a fourth means are activated concurrently for indicating that said brake switch is in a closed position and adverse conditions are present; and
   b. said fourth means operatively connecting with said power source.

17. A brake light circuit according to claim 16 and comprising:
   a. said first means comprising a relay;
   b. said second means comprising a flip-flop;
   c. said third means comprising an emission system low speed switch;
   d. said third means and said brake switch operatively connecting with said flip-flop;
   e. said fourth means operatively connecting with said flip-flop;
   f. said fourth means comprising an OR-gate operatively connecting with at least one of the following groups consisting of a headlight switch and a fog light switch and a windshield wiper switch;
   g. said isolation means comprising a NOR-gate operatively connecting with an AND-gate:
   h. said turn signal switch operatively connecting with said NOR-gate; p1 i. said AND-gate operatively connecting with said flip-flop;
   j. said AND-gate operatively connecting with a FET;
   k. said FET operatively connecting with said first low voltage side;
   l. said relay operatively connecting with said FET and with said first high voltage side;
   m. said power source operatively connecting with said NOR-gate and with said AND-gate;
   n. with said flip-flop being set and with said turn signal switch in an inactive state said AND-gate output is high and said FET is conducting and said relay is energized and said auxiliary light is connected to said turn signal flasher output and said auxiliary light is flashing; and
   o. with said flip-flop being set and with said turn signal switch in an active state said AND-gate output is low and said FET is not conducting and said relay is not energized and said auxiliary light is connected to said brake switch and said auxiliary light is an extension of the main brake lights.

18. A brake light circuit according to claim 16 and comprising:
   a. said first means comprising a first relay;
   b. said second means comprising a second relay and a third relay operatively connecting with said first relay to form a memory device;
   c. said third means comprising an emission system low speed switch;
   d. said third means and said brake switch operatively connecting with said memory device;
   e. said isolation means comprising a NOR-gate operatively connecting with an AND-gate;
   f. said brake switch operatively connecting with said AND-gate;
   g. diodes operatively connected to form an OR-gate;
   h. said fourth means comprising said OR-gate operatively connecting with at least one of the following groups consisting of a headlight switch and a fog light switch and a windshield wiper switch;
   i. said fourth means operatively connecting with said memory device;
   j. said turn signal switch operatively connecting with said NOR-gate;
   k. said AND-gate operatively connecting with said brake switch;
   l. said AND-gate operatively connecting with a FET;
   m. said FET operatively connecting with said first low voltage side;
   n. said memory device operatively connecting with said FET and with said first high voltage side;

o. said power source operatively connecting with said NOR-gate and with said AND-gate;

p. with said memory device being set and with said turn signal switch in an inactive state not connecting with said NOR-gate said AND-gate output is high and said FET is conducting and said first relay is energized and said auxiliary light is connected to said turn signal flasher output and said auxiliary light is flashing; and q. with said memory device being set and with said turn signal switch in an active state said AND-gate output is low and said FET is not conducting and said first relay is not energized and said auxiliary light is connected to said brake switch and said auxiliary light is an extension of the main brake lights.

19. A brake light circuit according to claim 16 and comprising:

a. said first means comprising a first relay;

b. said second means comprising a second relay and a third relay operatively connecting with said first relay to form a memory device;

c. said third means comprising an emission system low speed switch;

d. said third means and said brake switch operatively connecting with said memory device;

e. diodes operatively connected to form an OR-gate;

f. said fourth means comprising said OR-gate operatively connecting with at least one of the following groups consisting of a headlight switch and a fog light switch and a windshield wiper switch;

g. said fourth means operatively connecting with said memory device;

h. said isolation means comprising a switch operatively connecting with said first low voltage side and with said memory device;

i. with said memory device being set and with said turn signal switch in an inactive state said switch is closed and said first relay is energized and said auxiliary light is connected to said turn signal flasher output and said auxiliary light is flashing; and j. with said turn signal switch in an active state said switch is open and said first relay is not energized and said auxiliary light is connected to said brake switch and said auxiliary light is an extension of the main brake lights.

20. A brake light circuit according to claim 16 and comprising:

a. said first means comprising a relay;

b. said second means comprising said third means operatively connecting with said relay to form said memory device;

c. said fourth means comprising operatively connecting at least one of the following groups consisting of a headlight switch and a fog light switch and a windshield wiper switch;

d. said fourth means operatively connecting with said memory device;

e. said memory device operatively connecting with said brake switch;

f. said isolation means comprising a switch operatively connecting with said first low voltage side and with said memory device;

g. with said memory device being set and with said turn signal switch in an active state said switch is closed and said relay is energized and said auxiliary light is connected to said turn signal flasher output and said auxiliary light is flashing; and h. with said turn signal switch in an active state said switch is open and said relay is not energized and said auxiliary light is connected to said brake switch and said auxiliary light is an extension of the main brake lights.

21. A brake light circuit according to claim 1 and comprising:

a. a clutch switch;

b. a second means for operatively connecting said auxiliary high mount brake light to said turn signal flasher;

c. said second means being set for connecting said auxiliary light to said flasher output when said brake switch and said clutch switch are activated concurrently for indicating that said brake switch is closed and the clutch is disengaged;

d. said second means being reset for disconnecting said auxiliary light from said flasher output when said brake switch and said clutch switch are deactivated concurrently for indicating that said brake switch is open and said clutch is engaged; and e. said clutch switch and said second means operatively connecting with said power source.

22. A brake light circuit according to claim 21 and comprising:

a. said first means comprising a relay;

b. said second means comprising a flip-flop;

c. said clutch switch and said brake switch operatively connecting with said flip-flop;

d. said flip-flop operatively connecting with a FET;

e. said FET operatively connecting with said first low voltage side;

f. said relay operatively connecting with said FET and with said first high voltage side;

g. with said flip-flop being set said FET is conducting and said relay is energized and said auxiliary light is connected to said turn signal flasher output and said auxiliary light is flashing; and h. with said flip-flop being reset said FET is not conducting and said relay is not energized and said auxiliary light is connected to said brake switch and said auxiliary light is an extension of the main brake lights.

23. A brake light circuit according to claim 21 and comprising;

a. said first means comprising a first relay;

b. said second means comprising a second relay operatively connecting with said first relay to form a memory device;

c. said clutch switch and said brake switch operatively connecting with said memory device;

d. with said memory device being set said first relay is energized and said auxiliary light is connected to said turn signal flasher output and said auxiliary light is flashing; and e. with said memory device being reset said first relay is not energized and said auxiliary light is connected to said brake switch and said auxiliary light is an extension of the main brake lights.

24. A brake light circuit according to claim 21 and comprising:

a. said first means comprising a relay;

b. said second means comprising said clutch switch operatively connecting with said relay to form a memory device;

c. said memory device operatively connecting with said brake switch;

d. with said memory device being set said relay is energized and said auxiliary light is connected to said turn signal flasher output and said auxiliary light is flashing; and e. with said memory device being reset said relay is not energized and said auxiliary light is connected to said brake switch and said auxiliary light is an extension of the main brake lights.

25. A brake light circuit according to claim 21 wherein:

said isolation means operatively connecting with said first means and with said second means and with said turn signal switch for isolating said auxiliary high mount brake light from said flasher for precluding the flashing mode of illumination of said auxiliary brake light for the duration of time that said turn signal switch is activated.

26. A brake light circuit according to claim 25 and comprising:

a. said first means comprising a relay;

b. said second means comprising a flip-flop;

c. said clutch switch and said brake switch operatively connecting with said flip-flop;

d. said isolation means comprising a NOR-gate operatively connecting with an AND-gate;

e. said turn signal switch operatively connecting with said NOR-gate;

f. said AND-gate operatively connecting with said flip-flop;

g. said AND-gate operatively connecting with a FET;

h. said FET operatively connecting with said first low voltage side;

i. said relay operatively connecting with said FET and with said first high voltage side;

j. said power source operatively connecting with said NOR-gate and with said AND-gate;

k. with said flip-flop being set and with said turn signal switch in an inactive state not connecting with said NOR-gate said AND-gate output is high and said FET is conducting and said relay is energized and said auxiliary light is connected to said turn signal flasher output and said auxiliary light is flashing; and m. with said flip-flop being set and with said turn signal switch in an active state said AND-gate output is low and said FET is not conducting and said relay is not energized and said auxiliary light is connected to said brake switch and said auxiliary light is an extension of the main brake lights.

27. A brake light circuit according to claim 25 and comprising:

a. said first means comprising a first relay;

b. said second means comprising a second relay operatively connecting with said first relay to form a memory device;

c. said clutch switch and said brake switch operatively connecting with said memory device;

d. said isolation means comprising a NOR-gate operatively connecting with an AND-gate;

e. said turn signal switch operatively connecting with said NOR-gate;

f. said AND-gate operatively connecting with said memory device;

g. said AND-gate operatively connecting with a FET;

h. said FET operatively connecting with said first low voltage side;

i. said memory device operatively connecting with said FET and with said first high voltage side;

j. said brake switch operatively connecting with said AND-gate;

k. said power source operatively connecting with said NOR-gate and with said AND-gate;

l. with said memory device being set and with said turn signal switch in an inactive state not connecting with said NOR-gate said AND-gate output is high and said FET is conducting and said first relay is energized and said auxiliary light is connected to said turn signal flasher output and said auxiliary light is flashing; and m. with said memory device being set and with said turn signal switch in an active state said AND-gate output is low and said FET is not conducting and said relay is not energized and said auxiliary light is connected to said brake switch and said auxiliary light is an extension of the main brake lights.

28. A brake light circuit according to claim 25 and comprising:

a. said first means comprising a first relay;

b. said second means comprising a second relay operatively connecting with said first relay to form a memory device;

c. said clutch switch and said brake switch operatively connecting with said memory device;

d. said isolation means comprising a switch operatively connecting with said first low voltage side and with said memory device;

e. with said memory device being set and with said turn signal switch in an inactive state said switch is closed and said first relay is energized and said auxiliary light is connected to said turn signal flasher output and said auxiliary light is flashing; and f. with said turn signal switch in an active state said switch is open and said first relay is not energized and said auxiliary light is connected to said brake switch and said auxiliary light is an extension of the main brake lights.

29. A brake light circuit according to claim 25 and comprising:

a. said first means comprising a relay;

b. said second means comprising said clutch switch operatively connecting with said relay to form a memory device;

c. said memory device operatively connecting with said brake switch;

d. said isolation means comprising a switch operatively connecting said first low voltage side with said memory device;

e. with said memory device being set and with said turn signal switch in an inactive state said switch is closed and said relay is energized and said auxiliary light is connected to said turn signal flasher output and said auxiliary light is flashing; and f. with said turn signal switch in an active state said switch is open and said relay is not energized and said auxiliary light is connected to said brake switch and said auxiliary light is an extension of the main brake lights.

30. A brake light circuit according to claim 25 and comprising:

a. said first means comprising a relay;
b. said second means comprising a flip-flop;
c. said clutch switch and said brake switch operatively connected to said flip-flop;
d. said flip-flop operatively connecting with a FET;
e. said FET operatively connecting with said first low voltage side and with said first means;
f. said isolation means comprising a switch operatively connecting with said first high voltage side and with said relay;
g. with said flip-flop being set and with said turn signal switch in an inactive state said switch is closed and said relay is energized and said auxiliary light is connected to said turn signal flasher output and said auxiliary light is flashing; and
h. with said flip-flop being set and with said turn signal switch in an active state said switch is open and said relay is not energized and said auxiliary light is connected to said brake switch and said auxiliary light is an extension of the main brake lights.

31. A brake light circuit according to claim 25 and comprising:
a. said second means being set for connecting said auxiliary light to said flasher output when said brake switch and a third means are activated concurrently for indicating that said brake switch is in a closed position and adverse conditions are present; and
b. said third means operatively connecting with said power source.

32. A brake light circuit according to claim 31 and comprising:
a. said first means comprising a relay;
b. said second means comprising a flip-flop;
c. said clutch switch and said brake switch operatively connecting with said flip-flop;
d. said third means operatively connecting with said flip-flop;
e. said third means comprising an OR-gate operatively connecting with at least one of the following groups consisting of a headlight switch and a fog light switch and a windshield wiper switch;
f. said isolation means comprising a NOR-gate operatively connecting with an AND-gate;
g. said turn signal switch operatively connecting with said NOR-gate;
h. said AND-gate operatively connecting with said flip-flop;
i. said AND-gate operatively connecting with a FET; p1
j. said FET operatively connecting with said first low voltage side;
k. said relay operatively connecting with said FET and with said first high voltage side;
l. said power source operatively connecting with said NOR-gate and with said AND-gate;
m. with said flip-flop being set and with said turn signal switch in an inactive state said AND-gate output is high and said FET is conducting and said relay is energized and said auxiliary light is connected to said turn signal flasher output and said auxiliary light is flashing; and
n. with said flip-flop being set and with said turn signal switch in an active state said AND-gate output is low and said FET is not conducting and said relay is not energized and said auxiliary light is connected to said brake switch and said auxiliary light is an extension of the main brake lights.

33. A brake light circuit according to claim 31 and comprising:
a. said first means comprising a first relay;
b. said second means comprising a second relay and a third relay operatively connecting with said first relay to form a memory device;
c. said clutch switch and said brake switch operatively connecting with said memory device;
d. said isolation means comprising a NOR-gate operatively connecting with an AND-gate;
e. said brake switch operatively connecting with said AND-gate;
f. diodes operatively connected to form an OR-gate;
g. said third means comprising said OR-gate operatively connecting with at least one of the following groups consisting of a headlight switch and a fog light switch and a windshield wiper switch;
h. said third means operatively connecting with said memory device;
i. said turn signal switch operatively connecting with said NOR-gate;
j. said AND-gate operatively connecting with said brake switch;
k. said AND-gate operatively connecting with a FET;
l. said FET operatively connecting with said first low voltage side;
m. said memory device operatively connecting with said FET and with said first high voltage side;
n. said power source operatively connecting with said NOR-gate and with said AND-gate;
o. with said memory device being set and with said turn signal switch in an inactive state not connecting with said NOR-gate said AND-gate output is high and said FET is conducting and said first relay is energized and said auxiliary light is connected to said turn signal flasher output and said auxiliary light is flashing; and
p. with said memory device being set and with said turn signal switch in an active state said AND-gate output is low and said FET is not conducting and said first relay is not energized and said auxiliary light is connected to said brake switch and said auxiliary light is an extension of the main brake lights.

34. A brake light circuit according to claim 31 and comprising:
a. said first means comprising a first relay;
b. said second means comprising a second relay and a third relay operatively connecting with said first relay to form a memory device;
c. said clutch switch and said brake switch operatively connecting with said memory device;
d. diodes operatively connected to form an OR-gate;
e. said third means comprising said OR-gate operatively connecting with at least one of the following groups consisting of a headlight switch and a fog light switch and a windshield wiper switch;
f. said third means operatively connecting with said memory device;
g. said isolation means comprising a switch operatively connecting with said first low voltage side and with said memory device;
h. with said memory device being set and with said turn signal switch in an inactive state said switch is closed and said first relay is energized and said auxiliary light is connected to said turn signal flasher output and said auxiliary light is flashing; and i. with said turn signal switch in an active state said switch is open and said first relay is not energized and said auxiliary light is connected to said brake switch and said auxiliary light is an extension of the main brake lights.

35. A brake light circuit according to claim 31 and comprising:

a. said first means comprising a relay;

b. said second means comprising said clutch switch operatively connecting with said relay to form a memory device;

c. said third means comprising operatively connecting at least one of the following group consisting of a headlight switch and a fog light switch and a windshield wiper switch;

d. said third means operatively connecting with said memory device;

e. said memory device operatively connecting with said brake switch;

f. said isolation means comprising a switch operatively connecting with said first low voltage side and with said memory device;

g. with said memory device being set and with said turn signal switch in an inactive state said switch is closed and said relay is energized and said auxiliary light is connected to said turn signal flasher output and said auxiliary light is flashing; and h. with said turn signal switch in an active state said switch is open and said relay is not energized and said auxiliary light is connected to said brake switch and said auxiliary light is an extension of the main brake lights.

36. An improved brake light circuit for an automotive vehicle comprising:

a. a means for operatively connecting the auxiliary high mount brake light with the brake switch and with the turn signal flasher output and with the turn signal switch for changing the connection of said auxiliary light from that of being connected to the main brake lights to that of being connected to said turn signal flasher output for continuously flashing said auxiliary light; and b. an isolation means for precluding the flashing of said auxiliary light when said turn signal switch is activated.

37. A brake light circuit according to claim 36 wherein: said means comprising a relay and said isolation means comprising a logic circuit.

38. A brake light circuit according to claim 37 and comprising:

a. a means for providing an indicator for displaying the illumination mode of said auxiliary high mount brake light; and b. said means mounted in the automotive vehicle instrument panel.

39. An improved brake light circuit according to claim 37 wherein:

a means for selecting a turn signal flasher having an inherent audible operational characteristic for indicating the flashing mode of operation of said auxiliary high mount brake light.

40. A process for making an improved brake light circuit for an automotive vehicle comprising an auxiliary high mount brake light:

a. selecting a power source having a first low voltage side and a first high voltage side;

b. operatively connecting an auxiliary high mount brake light with said power source;

c. operatively connecting a brake switch with said power source;

d. operatively connecting a turn signal flasher, having an output, with said power source;

e. operatively connecting said auxiliary light to said flasher output with a first means for continuously flashing said auxiliary light and operatively disconnecting said auxiliary light from said flasher output;

f. operatively connecting a turn signal switch with said first low voltage side and with said turn signal flasher output; and g. operatively connecting said first means and said turn signal switch with an isolation means for isolating said auxiliary high mount brake light from said flasher for precluding the flashing mode of illumination of said auxiliary brake light for the duration of time that said turn signal switch is activated.

41. A process according to claim 40 and comprising:

a. operatively connecting a second means to said first means for operatively connecting said auxiliary high mount brake light to said turn signal flasher output;

b. operatively connecting a third means to said second means:

c. concurrently activating said brake switch and said third means to set said second means for connecting said auxiliary light to said flasher output; and d. concurrently deactivating said brake switch and said third means to reset said second means for disconnecting said auxiliary light from said flasher output and for connecting said auxiliary light to said brake switch.

42. A process according to claim 41 and comprising:

a. selecting as said first means the relay;

b. said second means comprising a memory device;

c. operatively connecting said memory device comprising said third means with said relay to form said memory device;

d. operative connecting said memory device with said brake switch;

e. operative connecting said memory device with said power source;

f. setting said memory device for connecting said auxiliary light to said turn signal flasher output; and g. resetting said memory device for connecting said auxiliary light to said brake switch.

43. A process according to claim 41 and comprising:

a. said second means comprising a memory device;

b. said third means from a group comprising a clutch switch and an emission system low speed switch;

c. concurrently activating said brake switch and said third means for setting said second means for connecting said auxiliary light to said flasher output; and d. concurrently deactivating said brake switch and said third means for resetting said second means for disconnecting said auxiliary light from said flasher output.

44. A process according to claim 43 and comprising:

a. operatively connecting a fourth means to said second means;

b. said fourth means from a group comprising a headlight switch and a fog light switch and a windshield wiper switch; and c. concurrently activating said brake switch and said fourth means to set said second means to connect said auxiliary light to said flasher output for indicating that said brake switch is closed at a time when adverse conditions exist.

45. A process according to claim 44 and comprising:

a. providing a means for visually indicating the illumination mode of the auxiliary high mount brake light; and
b. said means being an integral part of the automotive vehicle instrument panel.

* * * * *